(12) United States Patent
Nimmagadda et al.

(10) Patent No.: US 12,183,037 B2
(45) Date of Patent: Dec. 31, 2024

(54) 3D POSE ESTIMATION IN ROBOTICS

(71) Applicant: NVIDIA Corporation, Santa Clara, CA (US)

(72) Inventors: Sravya Nimmagadda, Santa Clara, CA (US); David Weikersdorfer, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/487,800

(22) Filed: Oct. 16, 2023

(65) Prior Publication Data

US 2024/0037788 A1 Feb. 1, 2024

Related U.S. Application Data

(63) Continuation of application No. 17/191,543, filed on Mar. 3, 2021, now Pat. No. 11,823,415.

(51) Int. Cl.
*G06T 7/73* (2017.01)
*B25J 9/16* (2006.01)
(Continued)

(52) U.S. Cl.
CPC .............. *G06T 7/75* (2017.01); *B25J 9/1697* (2013.01); *G06N 3/045* (2023.01); *G06N 3/08* (2013.01); *G06V 20/10* (2022.01)

(58) Field of Classification Search
CPC . G06T 2207/10024; G06T 2207/20081; G06T 2207/20084; G06T 2207/30252;
(Continued)

(56) References Cited

U.S. PATENT DOCUMENTS 11,823,415 B2 11/2023 Nimmagadda et al.
2010/0296724 A1* 11/2010 Chang .................. G06V 20/647
382/154
(Continued)

OTHER PUBLICATIONS

Christoph Heindl,"3D Robot Pose Estimation from 2D Images," Feb. 13, 2019, Computer Vision and Pattern Recognition,arXiv:1902. 04987, pp. 1-4.*
(Continued)

*Primary Examiner* — Omar S Ismail
(74) *Attorney, Agent, or Firm* — Taylor English Duma L.L.P.

(57) ABSTRACT

An autoencoder may be trained to predict 3D pose labels using simulation data extracted from a simulated environment, which may be configured to represent an environment in which the 3D pose estimator is to be deployed. Assets may be used to mimic the deployment environment such as 3D models or textures and parameters used to define deployment scenarios and/or conditions that the 3D pose estimator will operate under in the environment. The autoencoder may be trained to predict a segmentation image from an input image that is invariant to occlusions. Further, the autoencoder may be trained to exclude areas of the input image from the object that correspond to one or more appendages of the object. The 3D pose may be adapted to unlabeled real-world data using a GAN, which predicts whether output of the 3D pose estimator was generated from real-world data or simulated data.

20 Claims, 10 Drawing Sheets

(51) Int. Cl.
*G06N 3/045* (2023.01)
*G06N 3/08* (2023.01)
*G06V 20/10* (2022.01)

(58) Field of Classification Search
CPC .. G06T 7/74; G06T 7/75; G06V 10/26; G06V 10/82; G06V 20/10; G06N 3/045; G06N 3/08; B25J 9/163; B25J 9/1697; G05B 2219/40527
See application file for complete search history.

(56) References Cited

U.S. PATENT DOCUMENTS

| | | | | |
|---|---|---|---|---|
| 2018/0005034 | A1* | 1/2018 | Kaehler | G06V 10/242 |
| 2019/0222776 | A1* | 7/2019 | Carter | H04N 5/272 |
| 2019/0261566 | A1* | 8/2019 | Robertson | A01D 46/28 |
| 2019/0311546 | A1* | 10/2019 | Tay | G06T 7/521 |
| 2020/0160616 | A1* | 5/2020 | Li | G06V 10/776 |
| 2020/0194117 | A1* | 6/2020 | Krieger | G16H 30/40 |
| 2020/0311956 | A1* | 10/2020 | Choi | G06V 10/454 |
| 2020/0349763 | A1* | 11/2020 | Chen | G06T 7/73 |
| 2020/0376675 | A1* | 12/2020 | Bai | G06T 5/94 |
| 2020/0388071 | A1* | 12/2020 | Grabner | G06T 17/20 |
| 2020/0394813 | A1* | 12/2020 | Theverapperuma | G06F 18/2431 |
| 2021/0031375 | A1* | 2/2021 | Drumwright | B25J 9/1612 |
| 2021/0089040 | A1* | 3/2021 | Ebrahimi Afrouzi | A47L 9/2873 |
| 2021/0142497 | A1* | 5/2021 | Pugh | G06T 7/194 |
| 2021/0158561 | A1* | 5/2021 | Park | G06T 7/74 |
| 2021/0243362 | A1* | 8/2021 | Castillo | G06V 10/26 |
| 2021/0279950 | A1* | 9/2021 | Phalak | G06T 7/55 |
| 2021/0287430 | A1* | 9/2021 | Li | G06V 10/776 |
| 2022/0026920 | A1* | 1/2022 | Ebrahimi Afrouzi | G06N 7/01 |
| 2022/0044441 | A1* | 2/2022 | Kalra | G06T 7/579 |
| 2022/0066456 | A1* | 3/2022 | Ebrahimi Afrouzi | G06F 3/04883 |
| 2022/0187841 | A1* | 6/2022 | Ebrahimi Afrouzi | G05D 1/0274 |
| 2022/0284624 | A1 | 9/2022 | Nimmagadda et al. | |
| 2024/0119614 | A1* | 4/2024 | Ebrahimi Afrouzi | G01S 17/48 |

OTHER PUBLICATIONS

Wadim Kehl, "SSD-6D: Making RGB-Based 3D Detection and 6D Pose Estimation Great Again," Oct. 2017, Proceedings of the IEEE International Conference on Computer Vision (ICCV), 2017, pp. 1521-1527.*
Xinyi Ren, "Domain Randomization for Active Pose Estimation," Aug. 12, 2019, 2019 International Conference on Robotics and Automation (ICRA) Palais des congres de Montreal, Montreal, Canada, May 20-24, 2019, pp. 7228-7232.*
Martin Sundermeyer, "Implicit 3D Orientation Learning for 6D Object Detection from RGB Images," Sep. 2018, Proceedings of the European Conference on Computer Vision (ECCV), 2018,pp. 1-13.*
Paul Wohlhart, "Learning Descriptors for Object Recognition and 3D Pose Estimation," Jun. 2015,Proceedings of the IEEE Conference on Computer Vision and Pattern Recognition (CVPR), 2015,pp. 3109-3113.*
Stefan Thalhammer, "SyDPose: Object Detection and Pose Estimation in Cluttered Real-World Depth Images Trained using only Synthetic Data," Oct. 31, 2019, 2019 International Conference on 3D Vision (3DV),pp. 106-110.*
Nimmagadda, Sravya; Non-Final Office Action for U.S. Appl. No. 17/191,543, filed Mar. 3, 2021, mailed Mar. 24, 2023, 30 pgs.
Nimmagadda, et al.; Notice of Allowance for U.S. Appl. No. 17/191,543, filed Mar. 3, 2021, mailed Jul. 19, 2023, 14 pgs.
Xiang, et al.; (2017). Posecnn: A convolutional neural network for 6d object pose estimation in cluttered scenes. arXiv preprint arXiv:1711.00199.
Tzeng, et al. (2017). Adversarial discriminative domain adaptation. In Proceedings of the IEEE conference on computer vision and pattern recognition (pp. 7167-7176).
Karuvally, A. (2018). A Study into the similarity in generator and discriminator in GAN architecture. arXiv preprint arXiv:1802.07401.
Lucic, et al. (2017). Are gans created equal? a large-scale study. arXiv preprint arXiv:1711.10337; 10 pgs.
Serpa, Ygor; GAN Papers to Read in 2020: Reading suggestions on Generative Adversarial Networks.(2020). Retrieved from the Internet on Feb. 12, 2020 <https://towardsdatascience.com/gan-papers-to-read-in-2020-2c708af5c0a4>, 15 pgs.
Silva; Semi-supervised learning with Generative Adversarial Networks (GANs).(2017). Retrieved from the Internet on Feb. 12, 2020 <https://towardsdatascience.com/semi-supervised-learning-with-gans-9f3cb128c5e>; 15 pgs.

* cited by examiner

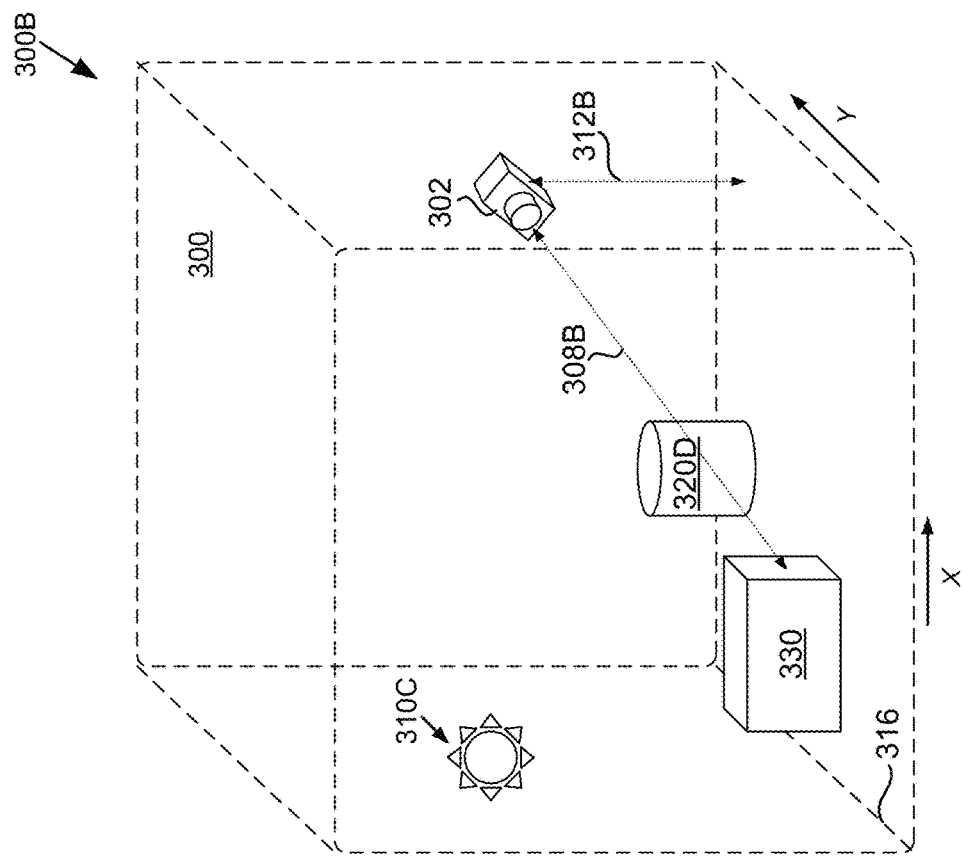
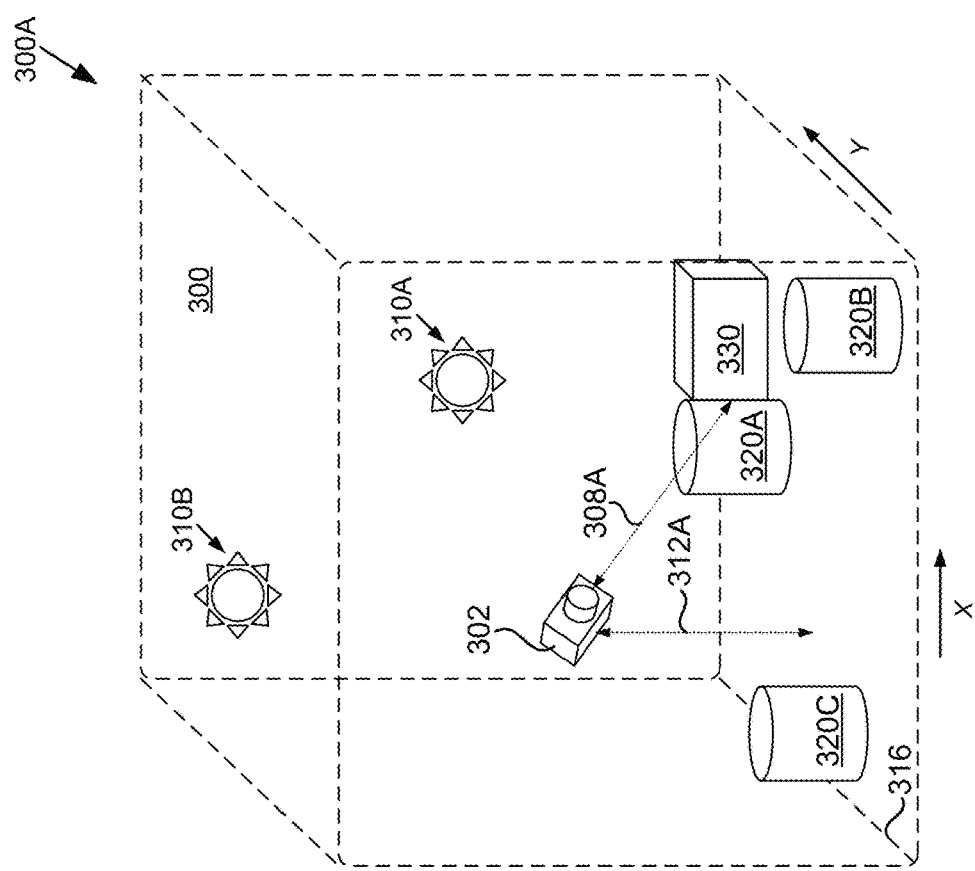

3D POSE ESTIMATION IN ROBOTICS

CROSS-REFERENCE TO RELATED APPLICATIONS

This application is a Continuation of U.S. patent application Ser. No. 17/191,543, filed Mar. 3, 2021, which is hereby incorporated by reference in its entirety.

BACKGROUND

Object detection and 3D pose estimation play a crucial role in many technology fields including robotics. These tasks are used in a variety of applications such as navigation, object manipulation, and inspection. Unfortunately, acquiring and labeling real-world data to train models for 3D pose estimation is extremely challenging, time consuming, and prone to error. The problem is especially aggravated for robotics. For example, robots may need to perform pose estimation in a wide variety of specialized scenarios, so collecting large amounts of accurate and labeled real-world data for every such scenario is prohibitive, which in turn slows down the rate of adoption of these models.

To address these problems, conventional systems use a trained, augmented autoencoder to encode different views of an object superimposed over random 2D backgrounds. After training, a codebook is generated for use in decoding that includes latent codes from images of different views assigned to corresponding rotations at a constant distance from the object. During inference, an image is provided to the augmented autoencoder, and the output code is decoded by comparing the code to all codes in the codebook. The rotation of the most similar view may then be used to estimate the rotation of the object while a bounding box of the object may be used to estimate the translation of the object. This approach accomplishes 3D pose estimation without requiring labeled training data, but introduces computational overhead from codebook generation and lookup, and results in a generic 3D pose estimator that may not be suited for specialized scenarios. Additionally, the object center for a 3D pose is determined by comparing a bounding box of the detected object to the corresponding codebook diagonal. However, this approach may lead to inaccurate results when occlusions are present.

To enhance the augmented autoencoder's robustness to noise, conventional systems may train the augmented autoencoders using RGB images of an unlit and unobstructed object augmented with various 2D occlusions, 2D backgrounds, lighting, reflections, and color distortions—each of which is considered noise. The augmented autoencoder may then be trained to produce the RGB images without those augmentations. While this approach may increase the robustness of the augmented autoencoder to noise, the augmented autoencoder itself would require a significant number of parameters to learn such representations.

SUMMARY

Embodiments of the present disclosure relate to techniques and approaches for performing three-dimensional (3D) pose estimation in robotics applications. More specifically, the current disclosure relates to architectural and training improvements for estimating poses of objects using Machine Learning Models (MLMs)—such as Convolutional Neural Networks (CNNs)—that are suitable for robotics and other applications.

In some respects, an autoencoder may be trained to predict 3D pose labels using simulation data extracted from a simulated environment, which may be configured to represent an environment in which the 3D pose estimator is to be deployed. Thus, the autoencoder may be trained while reducing or eliminating requirements for acquiring and labeling real-world data. The system may use assets and/or parameters to generate training data used to train the 3D pose estimator. A user may provide one or more assets that can be used to mimic the deployment environment such as 3D models or textures. The user may also provide various parameters to define deployment scenarios and/or conditions that the 3D pose estimator will operate under in the environment.

In further respects, the 3D pose estimator may include an object detector and an autoencoder. The object detector may provide object coordinate and size information used to crop a region that corresponds to the object from an input image. The cropped region may be provided for input to the autoencoder along with object coordinate and size information (e.g., a bounding box size and center coordinates). The autoencoder may predict one or more 3D pose labels, such as one or more rotation angles (e.g., a quaternion), translation parameters that identify a predicted center of the object (e.g., in the real-world), and a segmentation image or mask of the object. In contrast to traditional systems, the autoencoder may be trained to predict a segmentation image from an input image that is invariant to occlusions. Further, the autoencoder may be trained to exclude areas of the input image from the object that correspond to one or more appendages of the object.

In further respects, an MLM(s) trained to predict 3D poses of one or more objects using labeled simulated data may be adapted to real-world data without requiring real-world data labeled with 3D poses using a Generative Adversarial Network (GAN), which predicts whether output of the MLM(s) was generated from real-world data or simulated data.

BRIEF DESCRIPTION OF THE DRAWINGS

The present systems and methods for 3D pose estimation in robotics is described in detail below with reference to the attached drawing figures, wherein:

FIG. 3A is an illustration of a 3D environment in a configuration that may be rendered for use in training one or more MLMs to estimate 3D poses, in accordance with at least one embodiment of the present disclosure;

FIG. 3B is an illustration of a 3D environment in a different configuration than FIG. 3A that may be rendered for use in training one or more MLMs to estimate 3D poses, in accordance with at least one embodiment of the present disclosure;

DETAILED DESCRIPTION

Figure 1A:
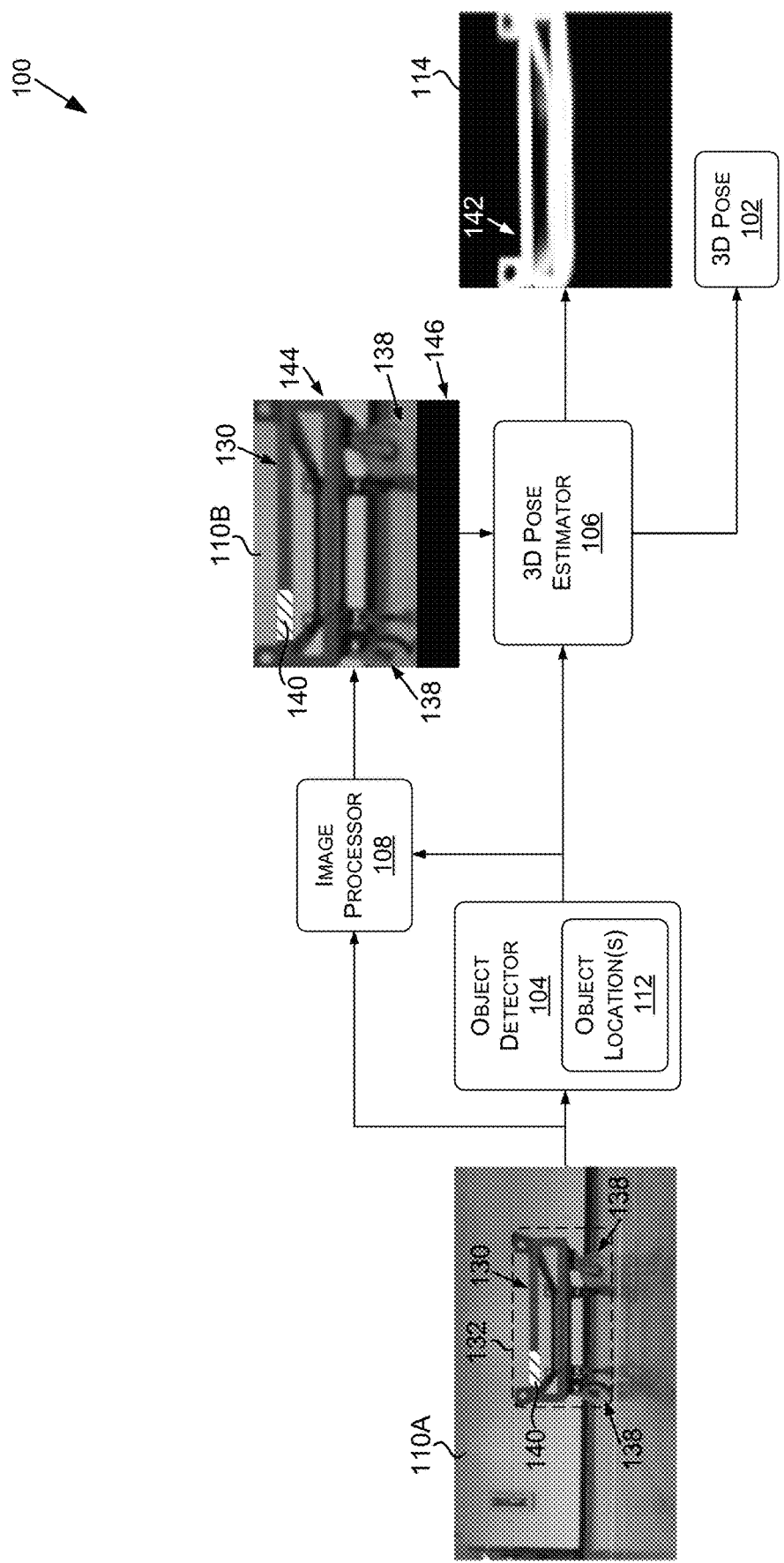
FIG. 1A is a data flow diagram illustrating an example process for estimating a 3D pose using one or more Machine Learning Models (MLMs), in accordance with at least one embodiment of the present disclosure.

Embodiments of the present disclosure relate to a three-dimensional (3D) pose estimation in robotics. More specifically, the current disclosure relates to architectural and training improvements for estimating poses of objects using Machine Learning Models (MLMs)—such as Convolutional Neural Networks (CNNs)—that is suitable for robotics and other applications.

The present disclosure, in contrast to traditional or conventional systems, may train an autoencoder to predict 3D pose labels using simulation data extracted from a simulated environment. The autoencoder learns to directly predict the 3D pose labels from the simulation data and therefore no codebooks or labeled real-world training images are needed. In at least one embodiment, the simulated environment may represent an environment in which the 3D pose estimator is to be deployed. Assets may be provided or indicated (e.g., by a user) that are captured from the deployment environment (e.g., using cameras, 3D capture technology, etc.) including 3D models (e.g., geometry, textures, etc.) of the environment and/or objects that are or may be present in the environment. Various parameters that define one or more deployment scenarios and/or conditions that the 3D pose estimator will operate under in the environment may also be provided (e.g., by the user). Examples include robot or camera constraints or characteristics, sensor parameters (used to capture sensor data used for inference), viewpoint parameters, location parameters, and/or lighting parameters. In further examples, parameters may relate to sensor occlusions that may occur during deployment. In various examples, the user may indicate and/or provide assets for objects that may occlude the sensor(s) used for inference (occlusion objects). The system may use the assets and/or the parameters supplied by the user to generate the training data.

The system may use the provided assets and/or parameters to populate and/or configure one or more simulated scenes, and synthetic training data may be captured from the perspective(s) of one more virtual sensors therein. For example, a (virtual) camera may be placed according to one or more location or viewpoint parameters, objects may be placed according to one or more environmental parameters, (virtual) lights may be placed according to one or more lighting parameters, etc. Randomness may be introduced, which may be relative to and/or constrained by corresponding parameters. For example, one or more random variables may be determined and/or applied frame-by-frame or otherwise to a simulated scene to generate different simulated frames and/or input sets of training data. Using disclosed approaches, full online simulation and training may be accomplished so that the simulated training data is generated on-the-fly—as the MLM is being trained. Thus, the training data may be generated during training and may be dynamically or otherwise rapidly adapted to training feedback.

In at least one embodiment, a 3D pose estimator may include an object detector and an autoencoder. An input image (e.g., an RGB image which may be a simulated image for training) may be provided to the object detector. The object detector may provide object coordinates (e.g., center coordinates), for example, of a bounding shape or box of a detected object based on the input image, as well as size information (e.g., height and width). The object coordinates (e.g., the bounding box center coordinates) and size information may be used to crop a region that corresponds to the object from the input image. The cropped region may be resized, rotated, and/or filled-in based on an input size of the autoencoder. Along with the cropped region, input to the autoencoder may include one or more locations of the object in the image or indicators thereof, such as the bounding shape coordinates (e.g., of the bounding box center). The autoencoder may predict one or more 3D pose labels, such as one or more rotation angles (e.g., a quaternion), translation parameters that identify a predicted center of the object (e.g., length and width predicted in image-space, and depth predicted in the real-world), and a segmentation image or mask (e.g., a de-noised segmentation image) of the object.

In contrast to traditional systems, the autoencoder may be trained to predict a segmentation image from an input image, where the segmentation image is invariant to occlusions. The segmentation image may comprise a segmentation mask that assigns a first value to image portions that correspond to the object and a second value to image portions that do not correspond to the object (e.g., binary values). The autoencoder may be trained to fill-in areas of the input image where the object is occluded so that the segmentation mask does not reflect occlusions. Such a segmentation image may be referred to as a de-noised segmentation image. This approach may increase the robustness of the autoencoder to noise without requiring a large number of parameters to learn such representations. For example, the object center may be more reliably predicted as the MLM may learn the overall shape of the object without occlusions. Additionally, the segmentation image may be used for 3D pose refinement, for example, to crop out a relevant depth-image point cloud, with the 3D pose estimate being used as a starting point to refine the pose.

In at least one embodiment, the autoencoder may be trained to exclude areas of the input image from the object that correspond to one or more appendages of the object. As an example, where the object is a dolly, a cart, or other object that includes wheels, the autoencoder may be trained to exclude wheels from the object in the segmentation image. Using this approach may increase the robustness of the MLM to the appendages. For example, from certain angles or perspectives an appendage may occupy a large percentage of an image, which may confuse the MLM. Additionally, for some types of objects an appendage may have an orientation that varies widely relative to an overall object, which may confuse the MLM. Using disclosed approaches, the MLM may learn to ignore or minimize the appendage(s) from 3D pose estimation.

In further respects, the disclosure provides approaches for adapting an MLM(s) trained to predict 3D poses of one or more objects using labeled simulated data to real-world data without requiring real-world data labeled with 3D poses. In at least one embodiment, the MLM(s) (e.g., the 3D pose estimator) may be provided simulated data or real-world data as input during and/or after training using labeled simulated data. The latent code of the MLM(s) (e.g., of the autoencoder) may be provided to a discriminator network, such as a Generative Adversarial Network (GAN), which predicts whether the latent code of the MLM(s) (e.g., the latent vector from which 3D poses are regressed from) was generated from real-world data or simulated data. An adapted latent code generated based at least on the discriminator output may be used to regress the MLM(s). Using the discriminator network, the MLM(s) may be trained to produce output such that the discriminator network is unable to effectively differentiate between real-world data and simulated data.

Now referring to FIG. 1A, FIG. 1A is a data flow diagram illustrating an example process 100 for estimating a 3D pose 102 using one or more Machine Learning Models (MLMs), in accordance with at least one embodiment of the present disclosure. The process 100 may be performed using, for example, an object detector 104, a 3D pose estimator 106, and an image processor 108. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software.

At a high level, the process 100 may include an object detector 104 receiving one or more inputs, such an image(s) 110A, and generating one or more outputs, such as an object location(s) 112 (e.g., one or more bounding box coordinates and sizes) from the one or more inputs. The process 100 may also include the image processor 108 receiving one or more inputs, such as the image(s) 110A and the object location(s) 112, and generating one or more outputs, such as an image(s) 110B (e.g., the image(s) 110A cropped using the bounding box information) from the one or more inputs. The process 100 may further include the 3D pose estimator 106 receiving one or more inputs, such as the object location(s) 112 and the image(s) 110B, and generating one or more outputs, such as a segmentation image 114 and the 3D pose 102 from the one or more inputs. The segmentation image 114 may comprise a decoded version of the image 110B.

In at least one embodiment, the image(s) input to the 3D pose estimator 106 may depict one or more portions of an object and an occlusion(s) to the object. For example, the image 110A may include one or more portions of an object 130 and an occlusion 140 to the object 130 (portions where the object 130 is blocked from being perceived in the image 110A). As a result, the image 110B input to the 3D pose estimator may also include at least some of the occlusion 140 and the object 130. In at least one embodiment, the 3D pose estimator 106 may comprise one or more MLMs trained to predict the 3D pose of the object (e.g., the 3D pose 102). The one or more MLMs may also be trained to predict that portions (e.g., pixels) of the image correspond to the object, despite the presence of an occlusion(s) to the object. For example, the one or more MLMs may be trained to predict portions of the image 110B as corresponding to the object 130, despite those portions corresponding to the occlusion 140 to the object 130. The predicted portions may correspond to a region 142 in the segmentation image 114. Examples of training of components used in the process 100 are described, in part, with respect to FIG. 2.

In at least one embodiment, the image(s) input to the 3D pose estimator 106 may depict one or more portions of one or more appendages of an object. For example, the image 110A may include one or more portions of appendages 138 of the object 130 (e.g., wheels). As a result, the image 110B input to the 3D pose estimator may also include at least some of the appendages 138 (e.g., the object detector 104 may be configured and/or trained to detect the object 130 including the appendages 138). In at least one embodiment, the 3D pose estimator 106 may comprise one or more MLMs trained to predict the 3D pose of the object (e.g., the 3D pose 102) and the segmentation image 114 while excluding the appendage(s) 138 from the object 130. For example, the segmentation image 114 does not include the appendages 138 as region(s) of the object 130, as the 3D pose estimator 106 is trained to exclude the appendages 138 from the object 130 in the segmentation image 114. Using this approach may increase the robustness of the 3D pose estimator 106 to the appendages. For example, from certain angles or perspectives the appendages 138 may occupy a large percentage of an image, which may confuse the 3D pose estimator 106. Additionally, an orientation of the appendages 138 may vary widely relative to the body of the object 130, which may confuse the MLM. For example, the appendages 138 comprise caster wheels which may have a rotational orientation that is independent of the rotational orientation of the body (e.g., cart) of the object 130. Using disclosed approaches, the 3D pose estimator 106 may learn to ignore or minimize the appendage(s) 138 from 3D pose estimation.

In some embodiments, the segmentation image 114 of the image 110B may not be a segmentation mask as shown, but may be a different type of decoded version of the image 110B in which one or more appendages 138 are excluded from the object 130. For example, the decoded version of the image 110B may comprise a color image, such as a denoised version of the image 110B that is invariant to occlusions, backgrounds, lighting, reflections, and/or color distortions in the image 110B and/or a 3D environment that is rendered to generate the image 110B. Additionally, the 3D pose estimator 106 may be trained to decode the image 110B while excluding the appendage(s) 138 of the object 130 without necessarily being trained to be invariant to occlusions. Further, while the object 130 is depicted as a dolly, many different types of objects having many different types of appendages are contemplated as being within the scope of the present disclosure. As a few non-limiting examples, an object may correspond to a person or animal and an appendage may correspond to an arm or leg, or an object may correspond to a vehicle (an automobile, a bicycle, a motorcycle, etc.) and the appendage may correspond to a wheel. In various embodiments, an appendage may have a rotational orientation capability that is independent and/or different than a rotational orientation capability of the body of the object along one or more axes in one or more regular states of the object (e.g., unbroken, primary, or common states, etc.).

Figure 2:
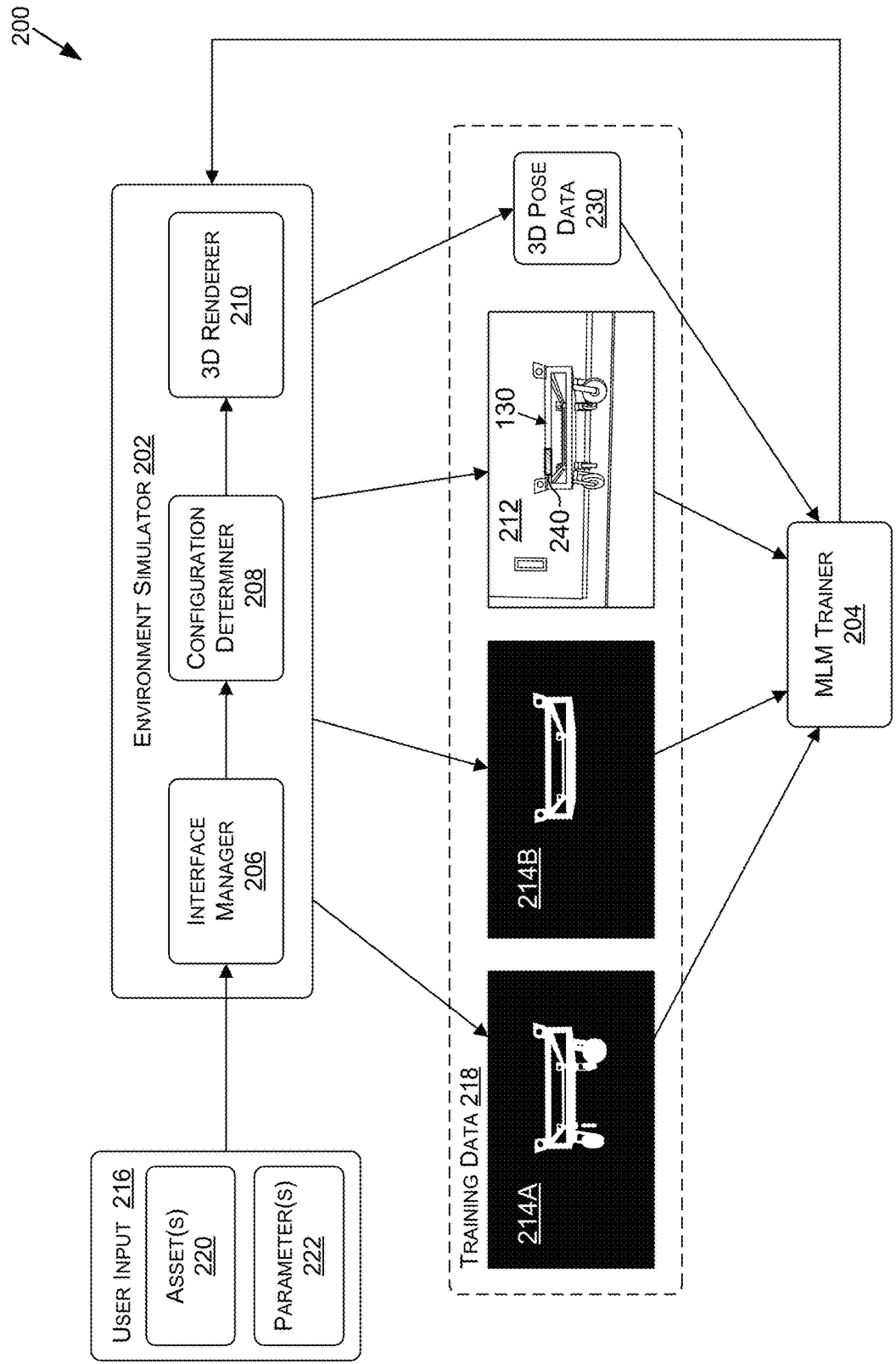
FIG. 2 is a data flow diagram illustrating an example process for training one or more Machine Learning Models (MLMs) to estimate 3D poses, in accordance with at least one embodiment of the present disclosure.

The object detector 104, the 3D pose estimator 106 and the image processor 108 may be implemented using one or more MLMs, examples of which are described with respect to FIG. 2. For example and without limitation, the MLMs described herein may include any type(s) of machine learning model(s), such as a machine learning model using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., one or more auto-encoders, convolutional, recurrent, perceptrons, Long/Short Term Memory (LSTM), Hopfield, Boltzmann, deep belief, deconvolutional, generative adversarial, liquid state machine, etc. neural networks), and/or other types of machine learning model.

The image 110A (e.g., a color image) may be represented by image data generated using one or more cameras, such as one or more cameras of a robot, a vehicle (e.g., an autonomous vehicle), and/or another mobile or stationary machine(s) or device(s). The image data may include data representative of images of a field of view of one or more cameras, such as a stereo camera(s), a wide-view camera(s) (e.g., fisheye cameras), infrared camera(s), surround camera(s) (e.g., 360 degree cameras), long-range and/or mid-range camera(s), and/or other camera types. In some embodiments, the image data may additionally or alternatively include other types of sensor data, such as LIDAR data from one or more LIDAR sensors, RADAR data from one or more RADAR sensors, audio data from one or more microphones, etc.

In some examples, the image data may be captured in one format (e.g., RCCB, RCCC, RB GC, etc.), and then converted to another format (e.g., by the image processor 108 and/or prior to being input to the image processor 108 and/or the object detector 104). In examples, the image data may be provided as input to an image data pre-processor (not shown) to generate pre-processed image data. Many types of images or formats may be used; for example, compressed images such as in Joint Photographic Experts Group (JPEG), Red Green Blue (RGB), or Luminance/Chrominance (YUV) formats, compressed images as frames stemming from a compressed video format (e.g., H.264/Advanced Video Coding (AVC), H.265/High Efficiency Video Coding (HEVC), VP8, VP9, Alliance for Open Media Video 1 (AV1), Versatile Video Coding (VVC), or any other video compression standard), raw images such as originating from Red Clear Blue (RCCB), Red Clear (RCCC) or other type of imaging sensor. In some examples, different formats and/or resolutions could be used for training the machine learning model(s) than for inferencing (e.g., during deployment of the machine learning model(s)).

An image data pre-processor may use image data representative of one or more images (or other data representations, such as LIDAR depth maps) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the image data pre-processor. This ordering may be chosen to maximize training and/or inference performance of the machine learning model(s).

In some embodiments, a pre-processing image pipeline may be employed by the image data pre-processor to process a raw image(s) acquired by a sensor(s) (e.g., camera(s)) and included in the image data to produce pre-processed image data which may represent an input image(s) to the input layer(s) (e.g., feature extractor layer(s)) of the machine learning model(s). An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the image data pre-processor, it may include bilateral denoising in the Bayer domain. Where demosaicing is employed by the image data pre-processor, it may include bilinear interpolation. Where histogram computing is employed by the image data pre-processor, it may involve computing a histogram for the C channel, and may be merged with the decompanding or noise reduction in some examples. Where adaptive global tone mapping is employed by the image data pre-processor, it may include performing an adaptive gamma-log transform. This may include calculating a histogram, getting a mid-tone level, and/or estimating a maximum luminance with the mid-tone level.

The object detector 104 may be configured to detect an object(s) in the image(s) 110A to determine the object location(s) 112. For example, the object detector 104 may comprise one or more MLMs that detect the object 130 and predict the object location(s) 112 of the object 130. Various types of object detectors may be used to implement the object detector 104. In at least one embodiment, the object detector 104 accepts an RGB image and determines bounding boxes for an object(s) of interest using any suitable object detection model available. For example, the object detector 104 may be trained to predict and/or determine the object location(s) 112 of a bounding shape, such as a bounding box 132 of the object 130. The object location(s) 112 may generally comprise one or more locations of the bounding shape in the image 110A, such as a center of the bounding box 132. In at least one embodiment, the object location(s) 112 may define a region of the bounding shape, for example, using the center of the bounding box 132 and sizes of one or more dimensions of the bounding box 132 (e.g., length and width). However, the region may be encoded in other ways, such as using multiple coordinates. Also, where the image 110A includes multiple objects, the image processor 108 may, by way of example and not limitation, generate separate object locations 112 for each object that the 3D pose estimator 106 may use to generate corresponding outputs. Additionally, while not shown, the process 100 may include an object tracker to track objects and/or corresponding 3D poses and/or segmentation masks across frames. For example, current and temporal 3D poses, segmentation masks, and/or object locations may be leveraged to generate corresponding outputs for frames in some embodiments.

The image processor 108 may be configured to process the image(s) 110A, such as to convert the image 110A into the image 110B that is provided as input to the 3D pose estimator 106. In at least one embodiment, the image processor 108 may crop images based on the object location(s) 112 detected for the images using the object detector 104. For example, the image processor 108 may use bounding boxes represented by the object locations 112 to crop the image 110A to a region 144 that corresponds to the bounding boxes. In examples where the region 144 has a different size than an input format of the 3D pose estimator 106, the image processor 108 may scale the region 144 and/or add padding 146 (e.g., black or homogenous pixels) to the region 144 to generate the image 110B. Further, where the image 110A includes multiple objects, the image processor 108 may, by way of example and not limitation, generate a separate image 110B for each object that the 3D pose estimator 106 may processes separately to generate corresponding outputs.

The 3D pose estimator 106 may be configured to predict 3D poses of objects depicted in input images, as well as segmentation images of the objects. For example, the 3D pose estimator 106 may comprise one or more MLMs that use bounding boxes (and/or one or more properties thereof) represented by the object locations 112 and the image 110B to generate output data representing predictions of the 3D pose 102 of the object 130 in the image 110B and to generate output data representing predictions of the segmentation image 114 of the object 130 in the image 110B. In other embodiments, the object locations 112 and/or the object detector 104 may not be included in the process 100. For example, the image processor 108 may prepare the image 110A for input to the 3D pose estimator without leveraging object detection and/or the 3D pose estimator may predict the 3D pose 102 or segmentation image 114 without leveraging the object locations 112. However, use of the object detector 104 and object locations 112 may improve performance of the 3D pose estimator 106.

In at least one embodiment, the one or more MLMs of the 3D pose estimator 106 may be trained to predict the 3D pose 102 as one or more 3D pose labels, such as one or more rotation angles (e.g., a quaternion) and translation parameters that identify a predicted center and a depth of the object. For example, the translation parameters may comprise object center coordinates including x and y coordinates in the image 110A (e.g., a camera image frame) or the image 110B, and depth from the camera in the real-world.

Figure 1B:
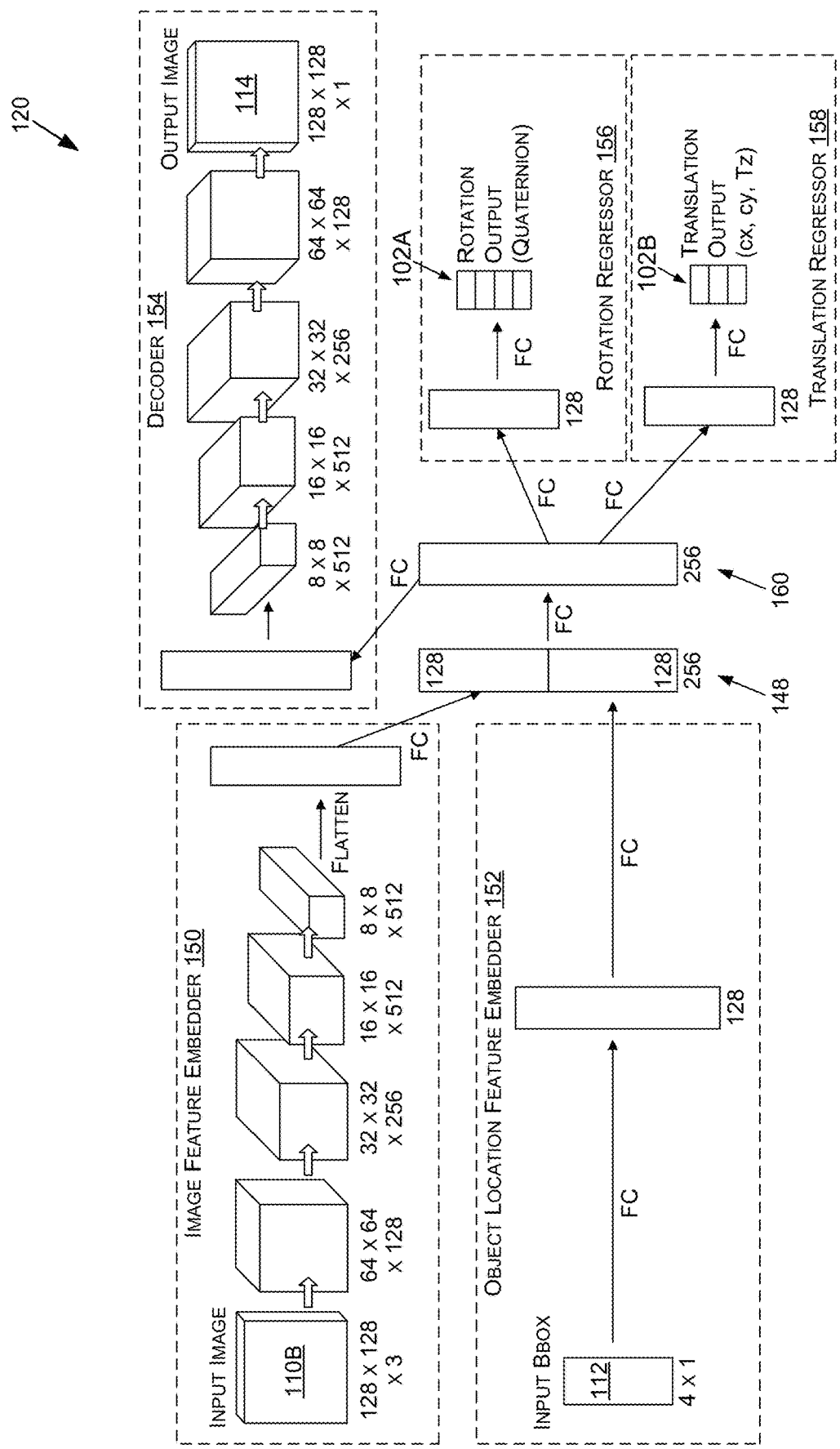
FIG. 1B is a block diagram of an example MLM that may be used for estimating 3D poses, in accordance with at least one embodiment of the present disclosure.

Referring now to FIG. 1B, FIG. 1B is a block diagram of an example MLM 120 that may be used for estimating 3D poses, in accordance with at least one embodiment of the present disclosure. In at least one embodiment, the 3D pose estimator 106 may comprise the MLM 120 of FIG. 1B. The MLM 120 includes an image feature embedder 150, an object location feature embedder 152, a decoder 154, a rotation regressor 156, and a translation regressor 158.

The MLM 120 may use the image 110B (e.g., a cropped RGB image) and the object location 112 (e.g., bounding box parameters) as inputs. The MLM 120 may further include the image feature embedder 150 (e.g., an encoder) to extract features of the image 110B and the object location feature embedder 152 (e.g., an encoder) to extract features of the object location(s) 112. One or more concatenation layers 148 may be used to concatenate the extracted feature embeddings in feature space (e.g., in a fully connected layer(s) 160). The decoder 154 may use the concatenated feature space to decode the image 110B into data that captures the segmentation image 114 (e.g., a de-noised segmentation image invariant to occlusions).

The rotation regressor 156 may use the concatenated feature space to estimate the rotation parameters 102A of the 3D pose 102 of the object 130 by posing it as a regression problem. In the example shown, the rotation parameters 102A (e.g., four rotation parameters) represent quaternions of the rotation of the object 130 in the camera frame. The translation regressor 158 may also use the concatenated feature space to estimate the translation parameters 102B of the 3D pose 102 of the object 130 by posing it as a regression problem. In the example shown, the translation parameters 102B define an object x-axis coordinate cx and an object y-axis coordinate cy of a camera image frame, and an object depth Tz from the camera in the real-world. The translation parameters 102B may represent a prediction of an object center (or other location) of the object 130 in 3D space. Layers and layer properties of the MLM 120 are shown in FIG. 1B as examples and may be varied. For example, additional or alternative layers, layer types, and/or sizes may be used depending on the embodiment.

Referring now to FIG. 2, FIG. 2 is a data flow diagram illustrating an example process 200 for training one or more Machine Learning Models (MLMs) to estimate 3D poses, in accordance with at least one embodiment of the present disclosure. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. The process 200 may be used, for example, to train the MLM(s) of the 3D pose estimator 106 of FIG. 1A, such as the MLM 120. The process 200 may be performed using, for example, an environment simulator 202 and an MLM trainer 110. The environment simulator 202 may comprise an interface manager 206, a configuration determiner 208, and a 3D renderer 210.

The environment simulator 202 may be configured to simulate an environment—such as a real-world environment in which the 3D pose estimator 106 is to be deployed—in order to generate training data 218. In at least one embodiment, the interface manager 206 of the environment simulator 202 may be configured to receive user input 216, which may provide one or more assets 220 and one or more parameters 222. The configuration determiner 208 of the environment simulator 202 may be configured to use the user input 216 to generate one or more configurations of the 3D environment (e.g., a configuration 300A of FIG. 3A or a configuration 300B of FIG. 3B). The 3D renderer 210 of the environment simulator 202 may be configured to render views (e.g., camera views) of configurations of the 3D environment. The rendered views and/or other data corresponding to a configuration of the 3D environment (e.g., 3D pose data) may be provided in the training data 218. The MLM trainer 204 may use the training data 218 to train the MLM(s) to predict 3D poses from image data. In at least one embodiment, each configuration of the 3D environment may correspond to a set of inputs that the MLM trainer 204 provides to the MLM(s) for training. In some examples, the MLM trainer 204 may provide feedback regarding the training, which the environment simulator 202 may use to adjust the configuration determiner 208 to vary the resulting configurations generated by the configuration determiner 208 (e.g., online during training). For example, the MLM trainer 204 may request additional occlusions, certain lighting conditions, camera poses, etc., that may be underrepresented in the training data 218 and/or that the MLM(s) may have a low prediction accuracy or confidence when present in the training data.

In various embodiments, the interface manager 206, the configuration determiner 208, and the 3D renderer 210 of the environment simulator 202 may be implemented using any number of applications or services. In at least one embodiment, the interface manager 206, the configuration determiner 208, and the 3D renderer 210 may be implemented, at least in part, using 3D graphics software that enables the creation, importation, configuration, and/or viewing of 3D models and/or one or more assets thereof (e.g., the assets 220). In at least one embodiment, the 3D graphics software may be implemented in an Integrated Development Environment (IDE) or Software-Development Environment, such as a game engine. Examples of game engines which may implement the interface manager 206, the configuration determiner 208, and/or the 3D renderer 210 include Unreal Engine, Unity, or CryEngine.

By way of example, and not limitation, the training data 218 includes a segmentation image 214A, a segmentation image 214B, an image 212, and 3D pose data 230. The image 212, the segmentation image 214A, the segmentation image 214B, and the 3D pose data 230 may correspond to a set of training data that the MLM trainer 204 uses train the MLM(s). The image 212 may serve as a training input corresponding to the image 110A and/or the image 110B, upon which inference is performed. The image 212 may comprise at least a portion of a 3D render of a field of view of at least one sensor in a virtual environment, such as the 3D environment 300 of FIGS. 3A and 3B.

Referring now to FIGS. 3A and 3B, FIG. 3A is an illustration of the 3D environment 300 in a configuration 300A that may be rendered for use in training the MLM 120 to estimate 3D poses, and FIG. 3B is an illustration of the 3D environment 300 in a configuration 300B that may be rendered for use in training the MLM 120 to estimate 3D poses. The configurations 300A and 300B include at least one sensor 302 (e.g., a virtual camera), and one or more other objects or elements, such as 3D models 330 (e.g., a 3D model of the object 130), 320A, 320B, 320C, and 320D, and light sources 310A, 310B, and 310C. In at least one embodiment, the image 212 may comprise at least a portion of a 3D render—rendered using the 3D renderer 210—of a field of view of the sensor 302 in the 3D environment 300, as configured by the configuration determiner 208. For example, the image 212 may correspond to a 3D render of the 3D environment 300 in the configuration 300A or the configuration 300B. In at least one embodiment, the image 212 may comprise a photorealistic render. The 3D renderer 210 may render the image 212 using any suitable 3D rendering techniques, such as ray-tracing, including global illumination and path tracing.

The segmentation image 214A, the segmentation image 214B, and the 3D pose data 230 may each correspond to the same configuration, or state, as the image 212. The segmentation image 214A may include the appendages of the object 130 and may be used by the MLM trainer 204 to generate ground truth object location(s) of the object 130 for the object detector 104. For example, a bounding shape may be determined from the segmentation image 214A algorithmically, such as by setting the length and the width of a bounding box to bound the non-black pixels of the segmentation image 214A. Padding may also be included in the ground truth object location(s).

The segmentation image 214B may exclude the appendages of the object 130 and may be used by the MLM trainer 204 as/or to generate a ground truth segmentation mask of the object 130 for the 3D pose estimator 106 (e.g., by rendering a view of the object 130 without the appendages). For example, the ground truth object location(s) determined from the segmentation image 214A may be used to crop the segmentation image 214B and padding (e.g., similar to the padding 146) may be used to achieve an aspect ratio consistent with the output tensor size of the decoder 154. The segmentation image 214B may also be scaled in some embodiments to fit the output tensor size of the decoder 154. In some embodiments, both the segmentation image 214A and 214B are not needed. For example, the segmentation image 214A may be used as a ground truth segmentation mask where the 3D pose estimator 106 is being trained to include the appendages in the segmentation image 114.

The segmentation images 214A and 214B may be rendered by the 3D renderer 210 from a same perspective and/or using a same sensor(s) used to render the image 212. For example, the perspective may match the perspective of the sensor 302 of FIG. 3A or 3B. In at least one embodiment, the segmentation images 214A and 214B (e.g., binary masks) may be rendered using one or more shaders configured to use a first color to mark pixels that belong to the object and a second color to mark pixels that do not belong to the object. For the segmentation image 214A, the shader(s) may treat the appendages as pixels that do not belong to the object.

The 3D pose data 230 may represent a 3D pose of the object 130 depicted in the image 212 (in the configuration of the 3D environment), and may be used as/or to generate a ground truth 3D pose for the 3D pose estimator 106. The 3D pose data 230 may, for example, be extracted from the configuration of the 3D environment that is captured in the image 212. For example, the 3D pose data 230 may be extracted from the 3D environment and/or data used to configure the 3D environment. By way of example and not limitation, the 3D pose data 230 may be extracted from a rigid body definition of the 3D model used to represent the object 130 in the configuration.

Using approaches described herein, the training data used by the MLM trainer 204 to train at least the 3D pose estimator 106 may be obtained without requiring the acquisition and labeling of real-world data. Thus, associated acquisition costs and propensities for error in labeling the data can be avoided, while enabling the customization of training to particular deployment environments and/or scenarios. This may result in improved training and performance of the MLMs (e.g., faster training and more accurate results). The customization may, for example, be facilitated by the user input 216, such that the assets 220 and/or the parameters 222 may be provided to configure a 3D environment(s) according to the deployment environments and/or scenarios.

As described herein, the interface manager 206 of the environment simulator 202 may be configured to receive the user input 216, which may provide the asset(s) 220 and/or the parameter(s) 222, any combination of which the configuration determiner 208 may use to determine one or more configurations of a 3D environment. In various examples, the user may indicate, specify, identify, and/or provide the asset(s) 220 for one or more objects that are to be a subject of inference (e.g., 3D pose estimation) and/or one or more objects that may be used to occlude the sensor(s) used for inference (occlusion objects) in the 3D environment.

The user input 216 may comprise any type or combination of user inputs suitable for identifying, defining, and/or creating the asset(s) 220 and/or the parameter(s) 222. As an example, user input may select, specify, and/or identify one or more files that the interface manager 206 of the environment simulator 202 can use to import, retrieve, and/or generate the asset(s) 110 and/or the parameter(s) 222 within the environment simulator 202 (e.g., within a 3D scene). In further examples, the asset(s) 220 and/or the parameter(s) 222 may be generated, at least in part, via user interactions with the environment simulator 202. For example, one or more assets 220 may be created using integrated 3D graphics software and/or other content creation software. One or more parameters 222 may be entered using graphical interface elements of the environment simulator 202. For example, a user may enter values for variables into corresponding forms of a user interface. In further examples, one or more parameters 222 and/or assets 220 may be identified, specified, and/or generated according to a script provided by the user input 216.

The asset(s) 220 may comprise one or more textures, backgrounds, animations, sounds, 3D models, shaders, materials, prefabs, meshes, effects, particle systems, geometry, cameras, sprites, and/or lighting definitions. In at least one embodiment, one or more of the textures, sounds, 3D models, geometry, etc. may be captured in the real-world environment in which the 3D pose estimator 106 is to be deployed (e.g., a warehouse, a building, a factory, etc.) using real image sensors.

The parameter(s) 222 may comprise values of variables (variable values), properties, and/or ranges that define one or more deployment scenarios and/or conditions of the 3D environment. For example, the parameter(s) 222 may define one or more deployment scenarios and/or conditions that the 3D pose estimator will operate under once deployed. In one or more embodiments, the variable values, properties, and/or ranges may be used by the configuration determiner 208 to generate, adjust, or define one or more of the assets 220 and/or other assets that may be included in a configuration of a 3D environment or scene. Examples of the parameters 222 include those that define camera constraints or characteristics, sensor parameters (used to capture sensor data used for inference), viewpoint parameters, location parameters, lighting parameters, and/or other elements of a 3D environment. In further examples, the parameters 222 may relate to sensor occlusions that may occur during deployment.

In at least one embodiment, the one or more parameters may define or specify a set of values—such as a range of values—that the configuration determiner 208 may select from to define a configuration. For example, the user input may provide an upper and/or lower value of a range of values that the configuration determiner 208 uses to select a value of a variable for an element of the 3D environment. The configuration determiner 208 may use a variety of possible selection strategies to select from the set of values defined for an element(s), such as a random selection strategy. The selection strategy may result in the configuration determiner 208 selecting different values of elements for different configurations. As an example, a camera constraint or characteristic defined by one or more of the parameter(s) 222 may include a perception distance of at least one sensor from an inference object (an object that is a subject of inference for the MLM). The one or more parameter(s) 222 may define or specify a range of distances from the camera that an inference object may be placed, such as from 2 meters to 4 meters. The configuration determiner 208 may select or sample a perception distance 308A for the configuration 300A and a perception distance 308B for the configuration 300B based on the parameter(s) 222.

Other examples of elements defined by one or more of the parameters 222 include those related to element height in world space. For a camera, the configuration determiner 208 may select or sample a perception height 312A for the configuration 300A and a perception height 312B for the configuration 300B. Further examples in accordance with one or more embodiments include viewpoint parameters such as yaw, roll, pitch and/or other aspects of camera pose. Additional examples of elements include location parameters related to element locations (e.g., in a plane). For example, the one or more of the parameter(s) 222 may define potential element locations within a plane 316 formed by an x and y-axis in the 3D environment 300, as illustrated in FIGS. 3A and 3B. The configuration determiner 208 may select 2D locations for elements (e.g., lights, an inference object, occlusion objects, a camera, etc.) within the plane using the one or more of the parameter(s) 222. By way of example and not limitation, the one or more of the parameter(s) 222 may define a 2D area of potential element locations within the plane (or 3D volume in some embodiments).

Examples of sensor parameters for a camera include simulated camera intrinsics (camera intrinsic properties or parameters), aperture, shutter speed, exposure time, ISO, lens type, focal length, etc. Examples of lighting parameters include settings for light sources (e.g., the light sources 310B, 310A, and 310C), such as those that define a quantity of light sources to include in a configuration (e.g., as a range), light type (e.g., directional, point, spot, or area), light travel range, light color, light intensity, etc. Using disclosed approaches, the sensor parameters may simulate the image sensor(s) that will be used to capture images when the 3D pose estimator 106 is deployed.

In further examples, parameters 222 may relate to sensor occlusions that may occur during deployment. In various examples, the user may indicate and/or provide assets for objects that may occlude the sensor(s) used for inference (occlusion objects). The system may use the assets and/or the parameters supplied by the user to generate the training data 218. For example, in FIGS. 3A and 3B, the 3D models 320A, 320B, 320C, and 320D may be occlusion objects spawned by the configuration determiner 208 based on the parameter(s) 222 associated with the occlusion objects. For example, the parameter(s) 222 may specify or define a quantity of occlusion objects to include in configurations and/or a range or set of quantities to include in the configurations. An occlusion object may or may not occlude the inference object (e.g., the 3D model 330), depending upon where the occlusion object is spawned (e.g., randomly). Further, an occlusion object may occlude the inference object by different amounts and in different regions for different configurations, thereby capturing a variety of potential real-world scenarios. In at least one embodiment, one or more of the assets 220 are designated or assigned to an occlusion object(s), such that the configuration determiner 208 uses the assets 220 and the parameters 222 when instantiating any number of occlusion objects. Using disclosed approaches, the occlusion object(s) may simulate real-world objects that are likely to occlude the image sensor(s) when the 3D pose estimator 106 is deployed.

Figure 4:
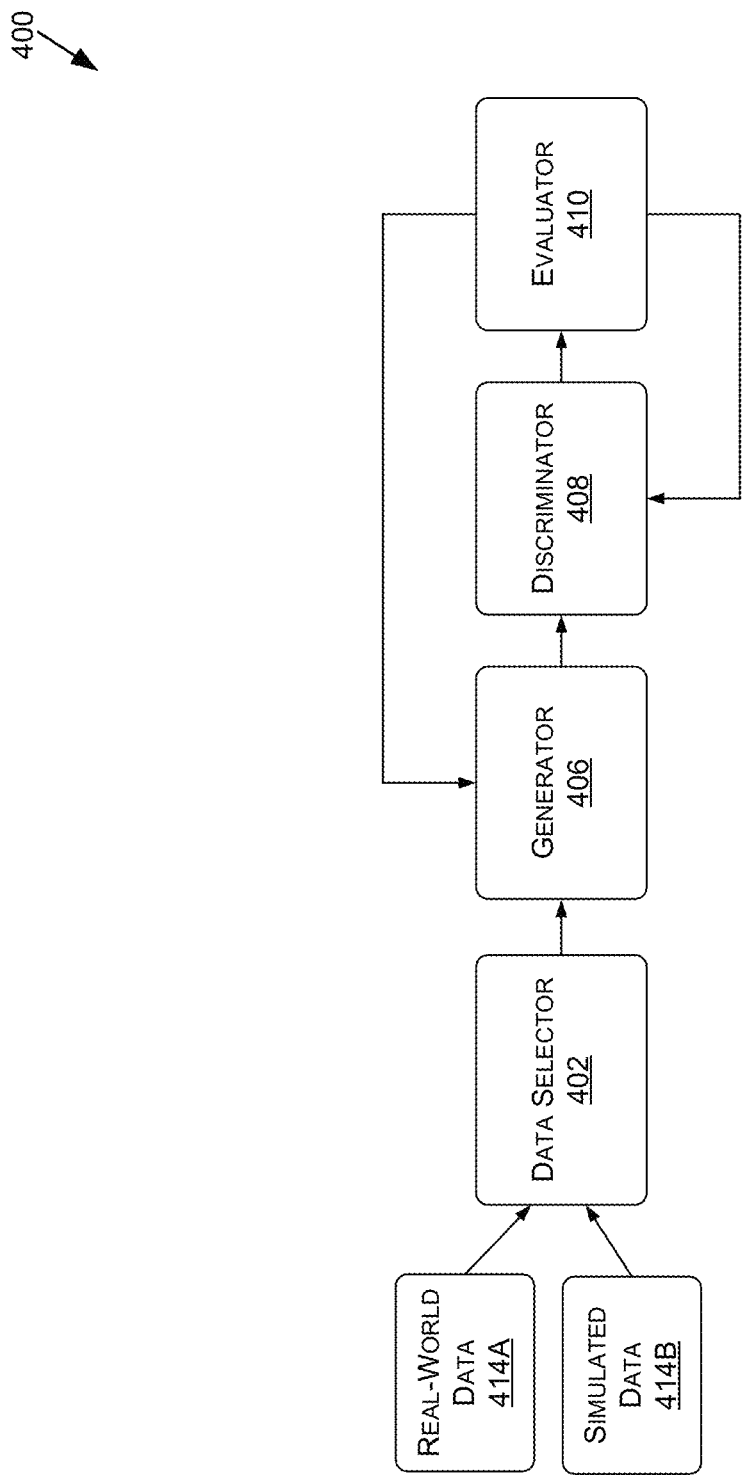
FIG. 4 is a data flow diagram illustrating an example process for adapting one or more MLMs that were trained using simulated data to real-world data, in accordance with at least one embodiment of the present disclosure.

Referring now to FIG. 4, FIG. 4 is a data flow diagram illustrating an example process 400 for adapting one or more MLMs that were trained using simulated data 414B to real-world data 414A, in accordance with at least one embodiment of the present disclosure. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software.

At a high level, the process 400 may include a data selector 402 selecting (e.g., randomly) input data from real-world data 414A and simulated data 414B and providing the selected input data(s) to a generator 406 of a Generative Adversarial Network (GAN). The generator 406 may include, for example the encoder of the 3D pose estimator 106 (e.g., at least the image feature embedder 150). The process 400 may also include the generator 406 generating one or more outputs and providing the one or more outputs to a discriminator 408 of the GAN. The outputs may comprise, for example, the latent code output by the encoder, which may correspond to one or more portions of the concatenation layer(s) 148 and/or the fully connected layer(s) 160. The discriminator may predict whether the selected data(s) is real-world data 414A or simulated data 414B (e.g., a yes/no prediction) from the latent vector used to regress 3D poses. The evaluator 410 may be configured to update the generator 406 based on the prediction, for example, using a binary loss function. The process 400 may repeat until an ending condition is met.

The simulated data 414B may be generated, for example, using the environment simulator 202 of FIG. 2 and may comprise labeled training data (e.g., corresponding to the training data 218). The real-world data 414A may comprise, by way of example and not limitation, unlabeled data (e.g., photographs and/or video) of the deployment environment being simulated by the environment simulator 202. The generator 406 may comprise one or more portions of the one or more MLMs of the 3D pose estimator 106, such as the MLM 120. Using disclosed approaches, the one or more MLMs may be adapted to generate a latent vector for the encoder that does not discriminate between simulated and target real data sets using labeled simulation data and unlabeled target real data so that the estimated pose and segmentation mask results in similar performance on target real data as with labeled simulation data.

The discriminator 408 may comprise one or more fully connected layers (e.g., three layers) that take a latent vector encoding from the 3D pose estimator 106 as input. In each iteration of the process 100, the data selector 402 may select (e.g., randomly) one or more sets of simulated data 414B (e.g., a simulated image and corresponding labels) and one or more sets of real-world data 414A (e.g., a real-world image). A simulated image and ground truth data from the simulated data 414B may be provided through the decoder (e.g., CNN) that performs the 3D pose prediction. The simulation latent vector may be provided to the discriminator 408 to predict sim/real and the prediction may be used by the evaluator 410 to compute segmentation mask and 3D pose losses and the discriminator binary loss for the simulated image. A real image may be sent through the encoder to get a real latent vector. The real latent vector may be sent into the discriminator 408 and may be used by the evaluator 410 to compute the discriminator binary loss for the real-world image.

The evaluator 410 may update one or more weights of the generator 406, that contains the encoder convolutional neural network, and the decoder for the 3D pose prediction based on the network loss. In one or more embodiments, the domain adaptive network loss may be computed using (for example and without limitation) one or more of: the positive weighted combination of the decoder segmentation mask loss, the rotation loss, the translation loss, and the negative weighted discriminator loss. The discriminator 408 network weights may also be updated by the evaluator 410 while keeping the pose CNN decoder network weights frozen from the previous step using a discriminator loss that is a combination of the discriminator binary loss for the simulated image(s) and the discriminator binary loss for the real image(s). In some embodiments, in an iteration there may be multiple learning steps used for the discriminator 408 per generator 406 learning step. This may be useful, for example, if starting from a pre-trained pose CNN decoder generator network so that the discriminator 408 can get up to speed with the generator network.

Figure 5:
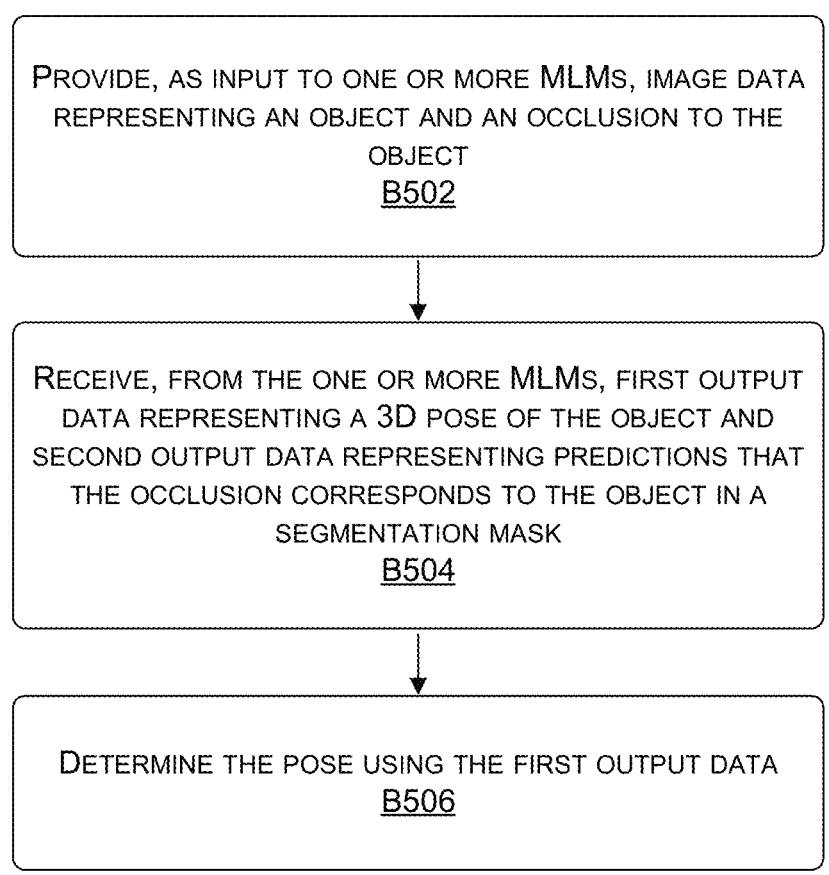
FIG. 5 is a flow diagram showing an example of a method for determining a 3D pose of an object using one or more MLMs, in accordance with at least one embodiment of the present disclosure.
Figure 6:
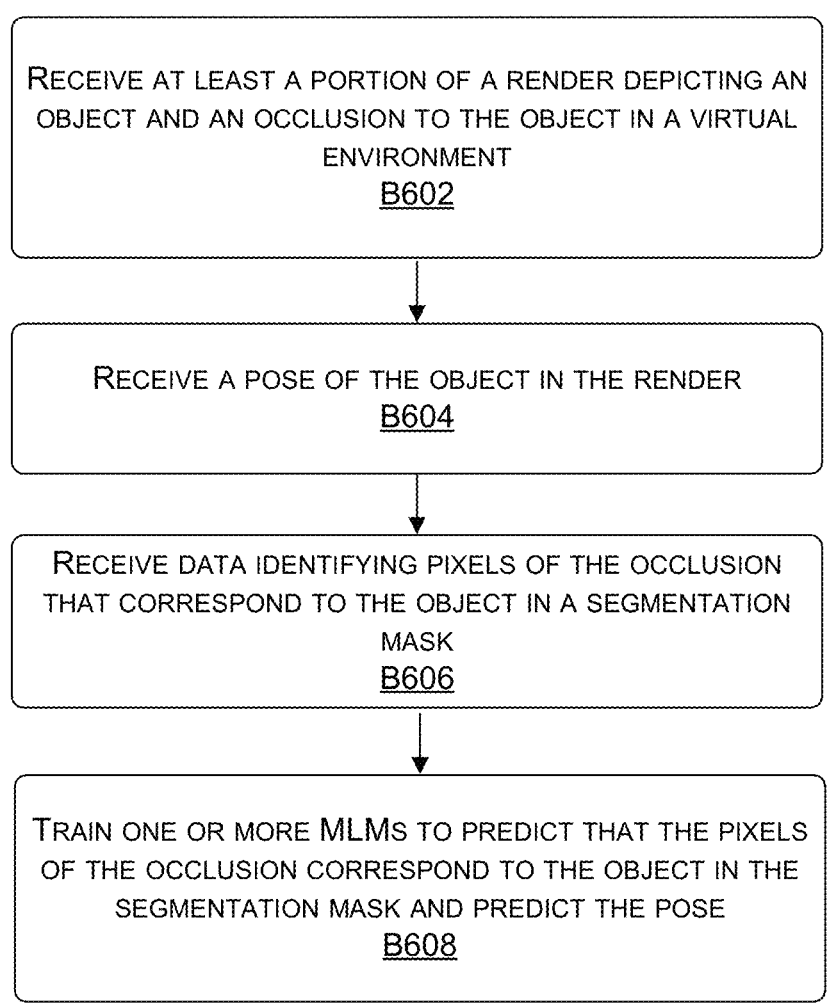
FIG. 6 is a flow diagram showing an example of a method for training one or more MLMs to estimate a 3D pose of an object, in accordance with at least one embodiment of the present disclosure.
Figure 7:
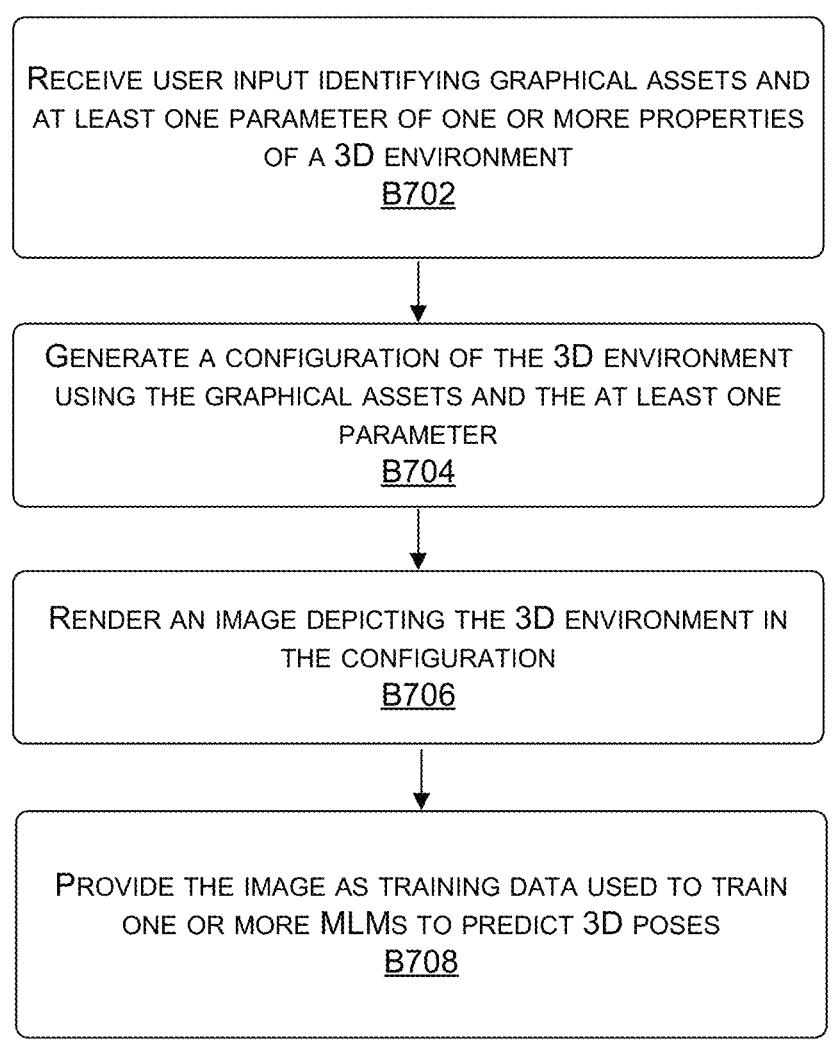
FIG. 7 is a flow diagram showing an example of a method for generating training data used to train one or more MLMs to estimate a 3D pose of an object, in accordance with at least one embodiment of the present disclosure.

Now referring to FIGS. 5-7, each block of methods 500, 600, and 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the systems components of FIGS. 1-3. However, these methods may additionally or alternatively be executed by any one system, or any combination of systems, including, but not limited to, those described herein.

FIG. 5 is a flow diagram showing an example of a method 500 for determining a 3D pose of an object using one or more MLMs, in accordance with at least one embodiment of the present disclosure. The method 500, at block B502, includes providing, as input to one or more MLMs, image data representing an object and an occlusion to the object. For example, image data representing the image 110B may be provided as input to the MLM 120 of the 3D pose estimator 106.

The method, at block B504, includes receiving, from the one or more MLMs, first output data representing a pose of the object and second output data representing predictions that the occlusion corresponds to the object in a segmentation mask. For example, output data representing the rotation parameters 102A, the translation parameters 102B, and the segmentation image 114 may be received from the MLM 120 of the 3D pose estimator 106. A portion of the output data for the segmentation image 114 may represent predictions that pixels of the image 110B that depict the occlusion 140 correspond to the region 142 of the object 130 in the segmentation image 114.

The method, at block B506 includes determining the pose using the first output data. For example, the 3D pose 102 may be determined using the output data representing the rotation parameters 102A and the translation parameters 102B. The 3D pose 102 may be used to control a robot or other machine or computing system.

FIG. 6 is a flow diagram showing an example of a method 600 for training one or more MLMs to estimate a 3D pose of an object, in accordance with at least one embodiment of the present disclosure. The method 600, at block B602, includes receiving at least a portion of a render depicting an object and an occlusion to the object in a virtual environment. For example, the MLM trainer 204 may receive image data representing at least a portion of the image 212, the image 212 depicting a first portion of the object 130 and the occlusion 140 to a second portion of the object 130.

The method 600, at block B604, includes receiving a pose of the object in the render. For example, the MLM trainer 204 may receive the 3D pose data 230 representing a 3D pose of the object 130 in the image 212.

The method 600, at block B606, includes receiving data identifying pixels of the occlusion that correspond to the object in a segmentation mask. For example, the MLM trainer 204 may receive data identifying pixels of the image 212 that correspond to at least a portion of the occlusion 240 in the segmentation image 214B.

The method 600, at block B608, includes training one or more MLMs to predict that the pixels of the occlusion correspond to the object in the segmentation mask and predict the pose. For example, the MLM trainer 204 may train the MLM 120 to predict that the pixels of the occlusion 140 correspond to the object 130 in the segmentation image 114 and predict the 3D pose 102 of the object 130 from at least a portion of the 3D render using the 3D pose data 230, the segmentation image 214B, and the image 212.

FIG. 7 is a flow diagram showing an example of a method 700 for generating training data used to train one or more MLMs to estimate a 3D pose of an object, in accordance with at least one embodiment of the present disclosure. The method 700, at block B702, includes receiving user input identifying graphical assets and at least on parameter of one or more properties of a 3D environment. For example, the interface manager 206 of the environment simulator 202 may receive the user input 216 that identifies the assets 220 in association with one or more elements of the 3D environment 300 and defines the parameter(s) 222 of one or more properties of the 3D environment 300.

The method 700, at block B704, includes generating a configuration of the 3D environment using the graphical assets and the at least one parameter. For example, the configuration determiner 208 may generate the configuration 300A of the 3D environment 300 that uses the assets 220 to represent the one or more elements in the 3D environment 300 based at least on selecting a 3D pose for the object 130 and a value of the one or more properties using the parameter(s) 222.

The method 700, at block B706, includes rendering an image depicting the 3D environment in the configuration. For example, the 3D renderer 210 may render the image 212 depicting the 3D environment 300 in the configuration 300A from a perspective of the sensor 302.

The method 700, at block B708, includes providing the image as training data used to train one or more MLMs to predict 3D poses. For example, the environment simulator 202 may provide the image 212 as the training data 218 used to train the MLM 120 to predict 3D poses from image data.

Example Computing Device

Figure 8:
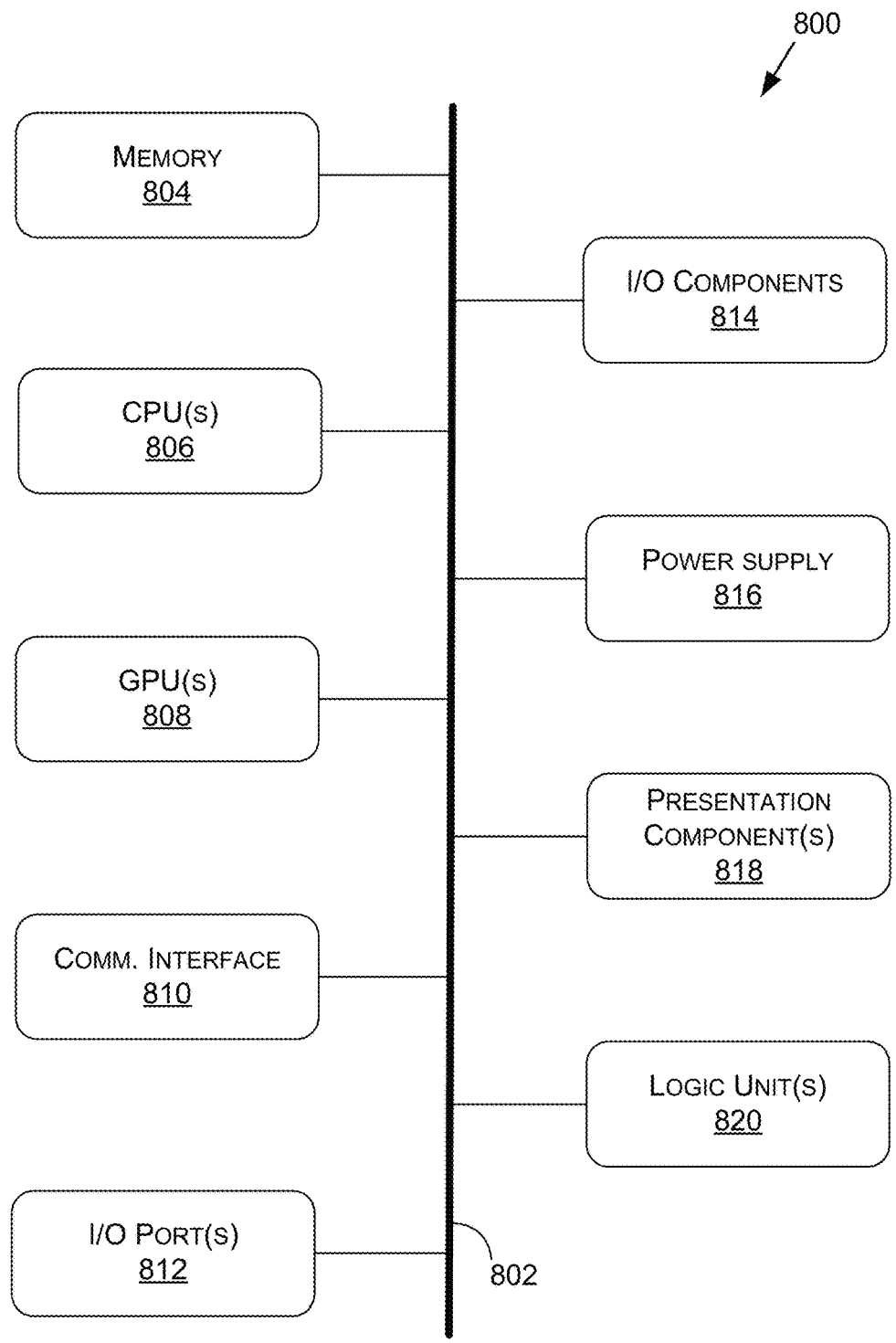
FIG. 8 is a block diagram of an example computing environment suitable for use in implementing at least one embodiment of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 807 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

Figure 9:
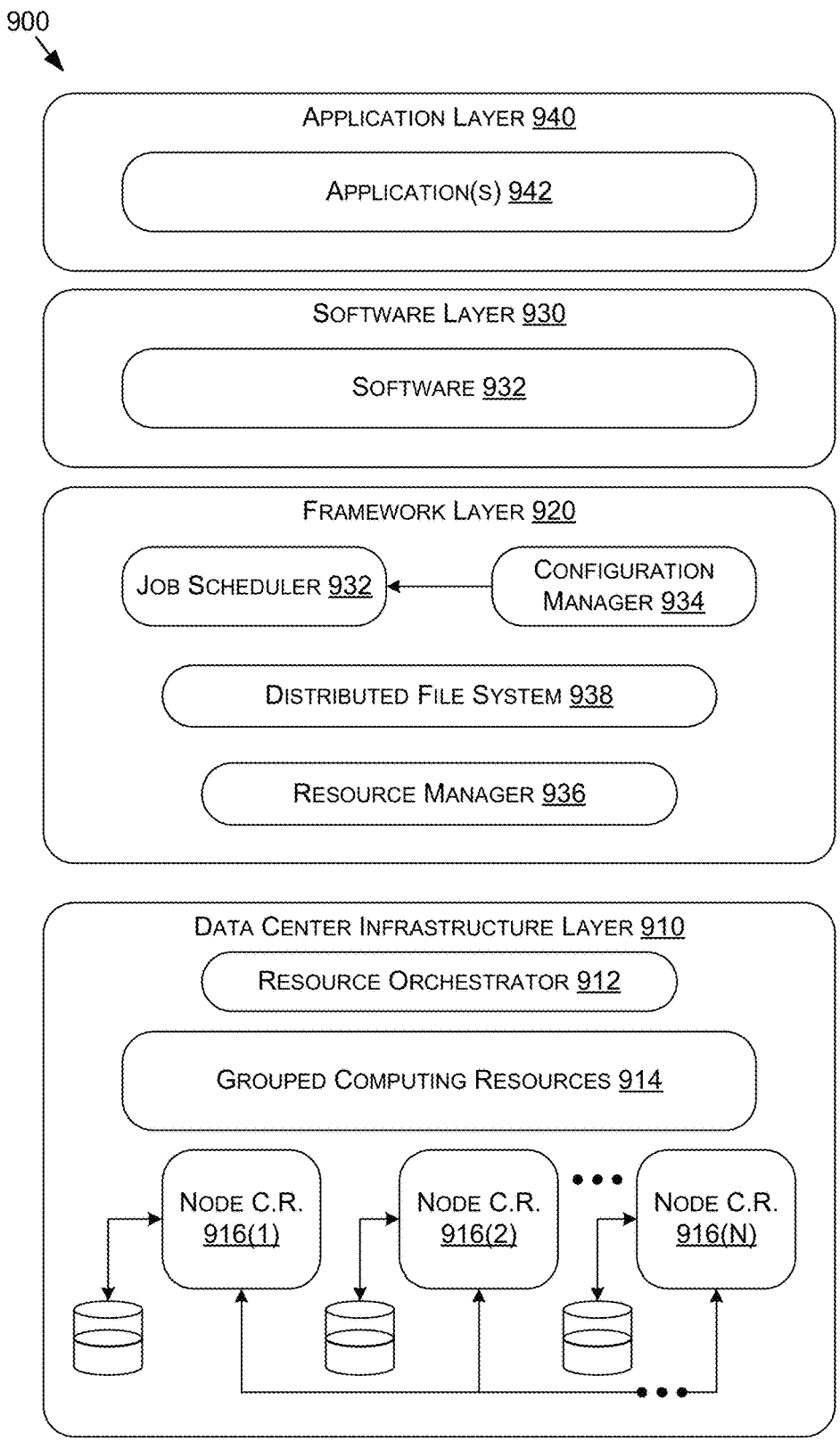
FIG. 9 is a block diagram of an example data center suitable for use in implementing at least one embodiment of the present disclosure.

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory, or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software, or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits to:
receive image data capturing an object in a field of view of at least one sensor associated with a robot or autonomous machine;
generate, using one or more Machine Learning Models (MLMs) and the image data, predictions indicating one or more pixels of an image depicting one or more portions of the object to exclude from a segmentation mask that corresponds to the object based at least on the one or more portions corresponding to one or more appendages of the object; and
determine one or more parameters corresponding to a pose of the object based at least on the predictions; and
perform one or more control operations for the robot or autonomous machine based at least on the one or more parameters.

2. The at least one processor of claim 1, wherein the predictions indicate the one or more pixels to exclude from the segmentation mask based at least on the one or more MLMs detecting the one or more pixels correspond to the one or more appendages.

3. The at least one processor of claim 1, wherein the determining the one or more parameters corresponding to the pose of the object is based at least on updating, using the predictions, an initial pose determined for the object.

4. The at least one processor of claim 1, wherein the one or more parameters indicate one or more of an orientation of the object or a position of the object.

5. The at least one processor of claim 1, wherein the one or more circuits are further to determine, using an object detector, one or more locations of the object in an image, wherein the image data corresponds to a version of the image that is modified based at least on the one or more locations.

6. The at least one processor of claim 1, wherein the one or more MLMs are updated to generate the predictions using ground truth data corresponding to segmentation masks produced from data representing a simulated environment comprising a model of the object, the segmentation masks excluding the one or more portions of the one or more appendages of the object.

7. The at least one processor of claim 1, wherein the one or more MLMS decode a representation of an image corresponding to the image data into the predictions corresponding to the segmentation mask.

8. The at least one processor of claim 1, wherein the at least one processor is comprised in at least one of:
 a control system for the robot or autonomous machine;
 a perception system for the robot or autonomous machine;
 a system for performing simulation operations;
 a system for performing light transport simulation;
 a system for performing content creation for 3D assets;
 a system for performing deep learning operations;
 a system implemented using an edge device;
 a system for generating synthetic data;
 a system incorporating one or more virtual machines (VMs);
 a system implemented at least partially in a data center; or
 a system implemented at least partially using cloud computing resources.

9. A method comprising:
 receiving an image capturing an object in a field of view of at least one sensor;
 receiving ground truth data representing one or more parameters corresponding to a pose of the object in the image and indicating one or more pixels that correspond to one or more portions of one or more appendages of the object in a segmentation mask corresponding to the image correspond to a background of the object based at least on the one or more portions corresponding to the one or more appendages of the object; and
 updating, using the image and the ground truth data, one or more Machine Learning Models (MLMs) to generate predictions indicating the one or more pixels that correspond to the one or more portions of one or more appendages of the object in the segmentation mask correspond to the background of the object and predictions indicating the one or more parameters corresponding to the pose.

10. The method of claim 9, wherein the image corresponds to a render of a field of perception corresponding to the at least one sensor in a virtual environment.

11. The method of claim 9, wherein the segmentation mask is rendered from three-dimensional (3D) data that represents a simulated environment comprising the object.

12. The method of claim 9, wherein at least one appendage of the one or more appendages has a different orientation than the pose of the object.

13. The method of claim 9, wherein the one or more parameters indicate one or more of an orientation of the object or a position of the object.

14. The method of claim 9, wherein the one or more MLMS are updated to decode the image into the predictions corresponding to the segmentation mask.

15. A system comprising:
 one or more processors to perform a method comprising:
  receiving, image data capturing an object in a field of view of at least one sensor;
  generating, using the image data and one or more Machine Learning Models (MLMs), predictions that ignore or minimize one or more pixels depicting at least a portion of one or more appendages of the object based at least on the one or more pixels corresponding to the one or more appendages of the object,
  computing, based at least on the predictions, one or more parameters corresponding to a pose of the object; and
  performing one or more control operations for a robot or autonomous machine based at least on the pose.

16. The system of claim 15, wherein the predictions correspond to a version of an image that excludes the one or more pixels from the image.

17. The system of claim 16, wherein the version of the image includes a segmentation mask.

18. The system of claim 15, wherein the predictions ignore or minimize the one or more pixels based at least on the one or more MLMs detecting the one or more pixels correspond to the one or more appendages.

19. The system of claim 15, wherein the one or more MLMs are trained to predict the one or more pixels representing the one or more appendages corresponds to a background of the object.

20. The system of claim 15, wherein the one or more processors are comprised in at least one of:
 a control system for the robot or autonomous machine;
 a perception system for the robot or autonomous machine;
 a system for performing simulation operations;
 a system for performing light transport simulation;
 a system for performing content creation for 3D assets;
 a system for performing deep learning operations;
 a system implemented using an edge device;
 a system for generating synthetic data;
 a system incorporating one or more virtual machines (VMs);
 a system implemented at least partially in a data center; or
 a system implemented at least partially using cloud computing resources.

* * * * *